Patented June 8, 1948

2,442,836

UNITED STATES PATENT OFFICE 2,442,836

PROCESS OF PREPARING HETEROCYCLIC ORGANIC COMPOUNDS

Robert B. Angier, Pearl River, N. Y., assignor, by mesne assignments, to American Cyanamid Company, New York, N. Y., a corporation of Maine No Drawing. Application November 29, 1945, Serial No. 631,794

8 Claims. (Cl. 260—250)

The present invention relates to a new method of preparing organic compounds possessing biological activity and other useful properties.

I have found that 2,4,5-triamino-6-hydroxy-pyrimidine and N-(2,3-dihydroxy-2-propenylidene)-aminobenzoic acid, or salts, esters, or amides thereof may be caused to react to produce compounds, many of which have useful biological activity. The reaction may be illustrated by the following equation:

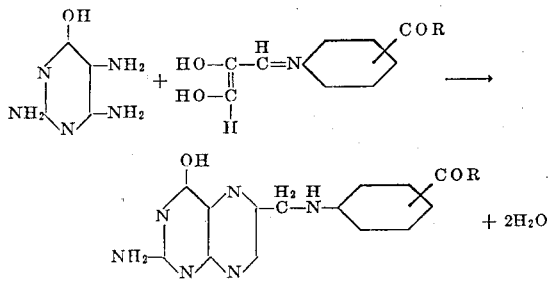

in which R is one of the radicals —OH, —OR', or —NR''R''', R' being an alkyl radical and R'' and R''' being hydrogen, aliphatic or aromatic radicals.

Generally speaking, the compounds which may be prepared by the process of the present invention are yellow to reddish-brown crystalline solids, difficultly soluble in water and organic solvents. Some possess vitamin-like properties and appear to be necessary for, or stimulate the growth of, certain bacteria and higher forms of animal life. Some are also useful in stimulating haemoglobin formation and in the treatment of agranulocytosis. Some of the compounds appear to possess anti-vitamin properties and are useful for this reason. Other compounds in the series possess properties which make them of value in still other ways.

Of the reactants, 2,4,5-triamino-6-hydroxy-pyrimidine is a known compound and may be prepared by methods which have been described in the chemical literature. As is also well known, this compound may exist in one or more tautomeric forms, such as:

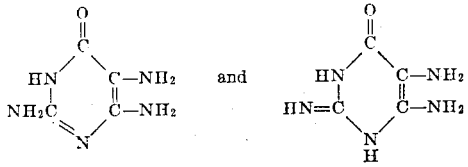

etc. Whether or not the compound exists in the keto form or the enol form probably depends upon the pH of the medium in which it is dissolved. In acid media the compound most likely exists in keto form whereas in alkaline media it exists as the enol form. It will also be noted that the 2-amino group may also be tautomeric with an imino group. As will be understood by those in the art, any of the tautomeric forms may be used in the same chemical reactions in like manner and reference hereinafter to the use of one tautomeric form includes the use of the others. Obviously, the final product may exhibit the same kind of tautomerism.

The N-(2,3-dihydroxy-2-propenylidene)-aminobenzoyl reactants include any in which the substituents on the benzene ring are ortho, meta, or para- to each other. The benzoyl group may be that of benzoic acid or one of its salts, esters or amides and other related derivatives thereof. The biological activity of the resulting product depends, in large measure, upon the particular N-(2,3-dihydroxy-2-propenylidene)-aminobenzoyl compound employed in the reaction. For example, when N-(2,3-dihydroxy-2-propenylidene)-p-aminobenzoic acid or its salts are used, the resulting product is biologically active as an essential growth factor for Streptococcus fecalis R but is, however, inactive with certain other organisms for which other compounds of the invention show activity.

The compounds that are formed when using esters of N-(2,3-dihydroxy-2-propenylidene)-aminobenzoic acid, such as the methyl, ethyl, butyl, benzyl, and the like, esters, do not appear to possess the same biological activity, being ineffective in promoting the growth of Streptococcus fecalis R and certain other organisms with which these compounds have been tested at the present time. It is possible, however, that these particular compounds may be of value in experimental medicine in other ways.

An important group of compounds prepared by the process of the present invention are those obtained when using as intermediates the amides of N-(2,3-dihydroxy-2-propenylidene)-aminobenzoic acid. These intermediates include, for example, those aliphatic and aromatic amides in which R'' and R''' in the general formula represent hydrogen, or aliphatic or aromatic radicals such as ethyl, ethanol, dodecyl, ethylhexyl, benzyl, phenyl, etc., and those in which R'' and R''' together form a closed ring.

Of the various amides of N-(2,3-dihydroxy-2-propenylidene)-aminobenzoic acid that may be employed as intermediates, the most important appear to be those of amino acids, particularly of glutamic acid, as for example, N-(2,3-dihydroxy-2-propenylidene)-p-aminobenzoylglutamic acid and polypeptides thereof, such as N-(2,3-dihydroxy-2-propenylidene)-p-aminobenzoylglutamylglutamic acid, N-(2,3-dihydroxy-2-propenylidene)-p-aminobenzoylglutamylglutamylglutamic acid and others having a plurality of peptid linkages made up of one or more of the various amino acids, such as N-(2,3-dihydroxy-2-propenylidene)-p-aminoglutamylglycylglutamic acid. Compounds prepared with these intermediates have a wider range of biological activity and are the preferred products of the present invention. Of course, amides of N-(2,3-dihydroxy-2-propenylidene)-p-aminobenzoic acid and other amino acids such as glycine, aspartic acid, leucine, alanine, isovaline, cysteine, and the like, are also important intermediates of the present invention. The amino acids may be natural or synthetic and may be in any of the d, l, or dl forms. As these amino acid amides possess free carboxyl groups, it will be apparent that the salts and esters thereof may likewise be employed.

The reaction may take place over a wide range of temperatures from about 60° C. to about 160° C. or higher. The time required may vary from about five minutes to four hours.

In carrying out the reaction the reactants are usually dissolved or suspended in a solvent such as ethylene glycol, water, ethyl alcohol, acetone, benzene, formamide, methyl ester of ethylene glycol, etc., or mixtures thereof.

Certain alkaline condensing agents such as sodium acetate, disodium phosphate, sodium formate, pyridine, dimethylaniline, N-methyl-N'-carbethoxy piperazine, etc., give increased yields of product.

The invention will now be described in greater particularity by means of the following examples in which various reaction conditions and reactants are shown. It will be understood, of course, that the invention is not limited to the particular details of these examples since other reaction conditions and reactants within the skill of the art may be employed to produce the compounds of the present invention.

*Example 1*

To 100 cc. of water at about 60° C. was added 5.0 g. of reductone and after maintaining the temperature at 60° C. for 15 minutes it was cooled to room temperature. This solution was added to a mixture of 16 g. of diethyl p-aminobenzoyl glutamate, 7 cc. of concentrated hydrochloric acid, 1600 cc. of water and 100 cc. of ethanol. The mixture was stirred rapidly at room temperature for several hours and placed in the refrigerator overnight. The precipitate which settled out was removed by filtration, washed once with ether, and dried. A yield of 16.7 g. (85%) of diethyl N-(2,3-dihydroxy-2-propenylidene)-p-aminobenzoylglutamate was obtained.

A mixture of 200 mg. of the product obtained above, 75 mg. of 2,4,5-triamino-6-hydroxy pyrimidine and 10 cc. of ethylene glycol was placed in a 40 cc. test tube. The tube was heated at 135° C. for 30 minutes while stirring. When the tube had cooled to room temperature 2 to 4 volumes of water was added. A couple drops of dilute hydrochloric acid was added to bring the pH to 3-4. The precipitate which separated was filtered off, washed with water, methanol and ether and dried. A yield of 125 mg. of crude product having the following structure was obtained.

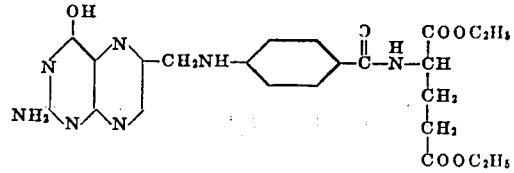

The ethyl groups on the glutamyl residue are easily removed by alkaline hydrolysis at room temperature by merely dissolving the diester in 0.2 N NaOH solution. The deesterified product may be purified by treatment of the solution with barium chloride followed by filtration to remove some of the impurities, removal of excess barium by precipitation with sulfuric acid, extraction with butanol and treatment with activated charcoal. The desired product is recovered by precipitation from aqueous solution by adjusting the pH to about 3. The product occurs in the form of yellow crystals which decompose when heated, without melting. The free acid is effective in stimulating the growth of *Streptococcus fecalis* R and *Lactobacillus casei*. When named under the ring index system as a substituted glutamic acid it would be called N-[4-p-[(2-amino-4-hydroxy-6-pyrimido[4,5-b]pyrazyl)methyl]-amino]benzoyl]glutamic acid.

*Example 2*

A mixture of 200 mg. of diethyl-N-(2,3-dihydroxy-2-propenylidene)-p-aminobenzoyl-glutamate, 150 mg. of 2,4,5-triamino-6-hydroxy pyrimidine and 10 cc. of ethylene glycol was placed in a 40 cc. test tube. The mixture was heated at 135° C. for thirty minutes while stirring. After cooling to room temperature 2 to 4 volumes of water was added and also a few drops of dilute hydrochloric acid to bring the pH to 3-4. The precipitate was separated by filtration, washed with water, methanol and ether and dried. A yield of 155 mg. of the crude diethyl ester identical with that of Example 1 was obtained.

*Example 3*

A mixture of 1.0 g. of diethyl N-(2,3-dihydroxy-2-propenylidene)-p-aminobenzoylglutamate, 0.75 g. of 2,4,5-triamino-6-hydroxy pyrimidine and 10 cc. of ethylene glycol was placed in a 40 cc. test tube. While continually stirring the mixture was heated at 130°-140° C. for thirty minutes. After cooling to room temperature 2 to 4 volumes of water was added and also a few drops of dilute hydrochloric acid to bring the pH to 3-4. The precipitate was separated by filtration, washed with water, methanol and ether and dried. The product is obtained in better yields than those of the preceding examples.

*Example 4*

A mixture of 7 g. of diethyl N-(2,3-dihydroxy-2-propenylidene)-p-aminobenzoylglutamate, 5 g. of 2,4,5-triamino-6-hydroxy pyrimidine and 200 cc. of ethylene glycol was placed in a 250 cc. flask and heated at 130°-140° C. for thirty minutes while stirring continually. The mixture was cooled a little and poured into about 600 cc. of water followed by the addition of a few drops of hydrochloric acid to bring the mixture to a pH of 3-4. The precipitate was removed, washed with water, methanol, and ether and dried. A yield of 5.5 g. of crude diester was obtained.

Example 5

To 100 mg. of diethyl N-(2,3-dihydroxy-2-propenylidene)-p-aminobenzoylglutamate in 10 cc. of 0.5 N sodium hydroxide was added 40 mg. of 2,4,5-triamino-6-hydroxy pyrimidine and the mixture heated on the steam bath for one hour. The solution was then cooled and neutralized to pH 3–4 with hydrochloric acid. The crude product was separated by centrifuging, washed and dried. A yield of 25 mg. was obtained.

Example 6

A mixture of 100 mg. of N-(2,3-dihydroxy-2-propenylidene)-p-aminobenzoylglutamic acid, 45 mg. of 2,4,5-triamino-6-hydroxy-pyrimidine and 5 cc. of ethylene glycol was heated at 135° C. for 30 minutes while stirring. The mixture was cooled to room temperature and 2 to 4 volumes of water added. A few drops of dilute hydrochloric acid was added to bring the pH to 3–4. The product was filtered, washed with water, methanol, and ether and dried. A yield of 50 mg. of crude N-[-4-p-[(2-amino-4-hydroxy-6-pyrimido[4,5-b]pyrazyl)methyl]amino}benzoyl]glutamic acid was obtained.

Example 7

One gram of reductone was dissolved in 140 cc. of water and warmed up for a short time to depolymerize the reductone. The solution was then cooled to room temperature and 10 drops of concentrated hydrochloric acid was added followed by the addition of 1.8 g. of ethyl p-aminobenzoate. After stirring vigorously for twenty minutes the product was filtered off, washed with a small amount of ether and dried. A yield of 2.4 g. of ethyl N-(2,3-dihydroxy-2-propenylidene)-p-aminobenzoate was obtained.

To 5 cc. of ethylene glycol was added 100 mg. of the compound prepared above and 60 mg. of 2,4,5-triamino-6-hydroxy pyrimidine and the mixture heated at 135°–145° C. for one hour. After cooling, 10 cc. of water was added and the product centrifuged, washed with water, methanol and ether and then dried.

I claim:

1. The method which comprises mixing together at a temperature within the range 60° C. to 160° C. in a solvent 2,4,5-triamino-6-hydroxy-pyrimidine and a member of the group consisting of N-(2,3-dihydroxy-2-propenylidene) aminobenzoic acid, its salts, esters and amides and recovering the pterins which form.

2. A method of preparing compounds having the general formula:

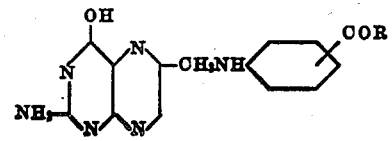

in which R is a member of the group consisting of —OH, OR' and

radicals in which R' represents an alkyl radical and R" and R'" represent hydrogen, aliphatic or aromatic radicals which comprises heating together in a solvent at a temperature within the range 60° C. to 160° C. 2,4,5-triamino-6-hydroxy-pyrimidine and a member of the group consisting of N-(2,3-dihydroxy-2-propenylidene) aminobenzoic acid, its salts, esters and amides and recovering the said product.

3. A method of preparing compounds having the general formula:

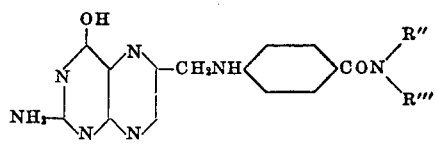

in which R" and R'" are members of the group consisting of hydrogen, aliphatic and aromatic radicals which comprises heating together in a solvent at a temperature within the range 60° C. to 160° C. 2,4,5-triamino-6-hydroxypyrimidine and an amide of N-(2,3-dihydroxy-2-propenylidene) aminobenzoic acid and recovering the said product.

4. A method in accordance with claim 3 in which the amide of N-(2,3-dihydroxy-2-propenylidene) aminobenzoic acid is that of glutamic acid.

5. A method in accordance with claim 3 in which the amide of N-(2,3-dihydroxy-2-propenylidene) aminobenzoic acid is that of aspartic acid.

6. A method in accordance with claim 3 in which the amide of N-(2,3-dihydroxy-2-propenylidene) aminobenzoic acid is that of an amino acid having a peptide linkage.

7. A method in accordance with claim 3 in which the amide of N-(2,3-dihydroxy-2-propenylidene) aminobenzoic acid is that of glutamylglutamic acid.

8. The method which comprises mixing together in a solvent and heating at a temperature within the range 60° C. to 160° C. diethyl N-(2,3-dihydroxy-2-propenylidene)-p-aminobenzoylglutamate and 2,4,5-triamino-6-hydroxy pyrimidine, and after reaction thereof recovering the resulting pteroylglutamate.

ROBERT B. ANGIER.